March 28, 1944.  C. A. DE GIERS  2,345,464
SAFETY DEVICE FOR INSTRUMENTS
Filed Jan. 8, 1941
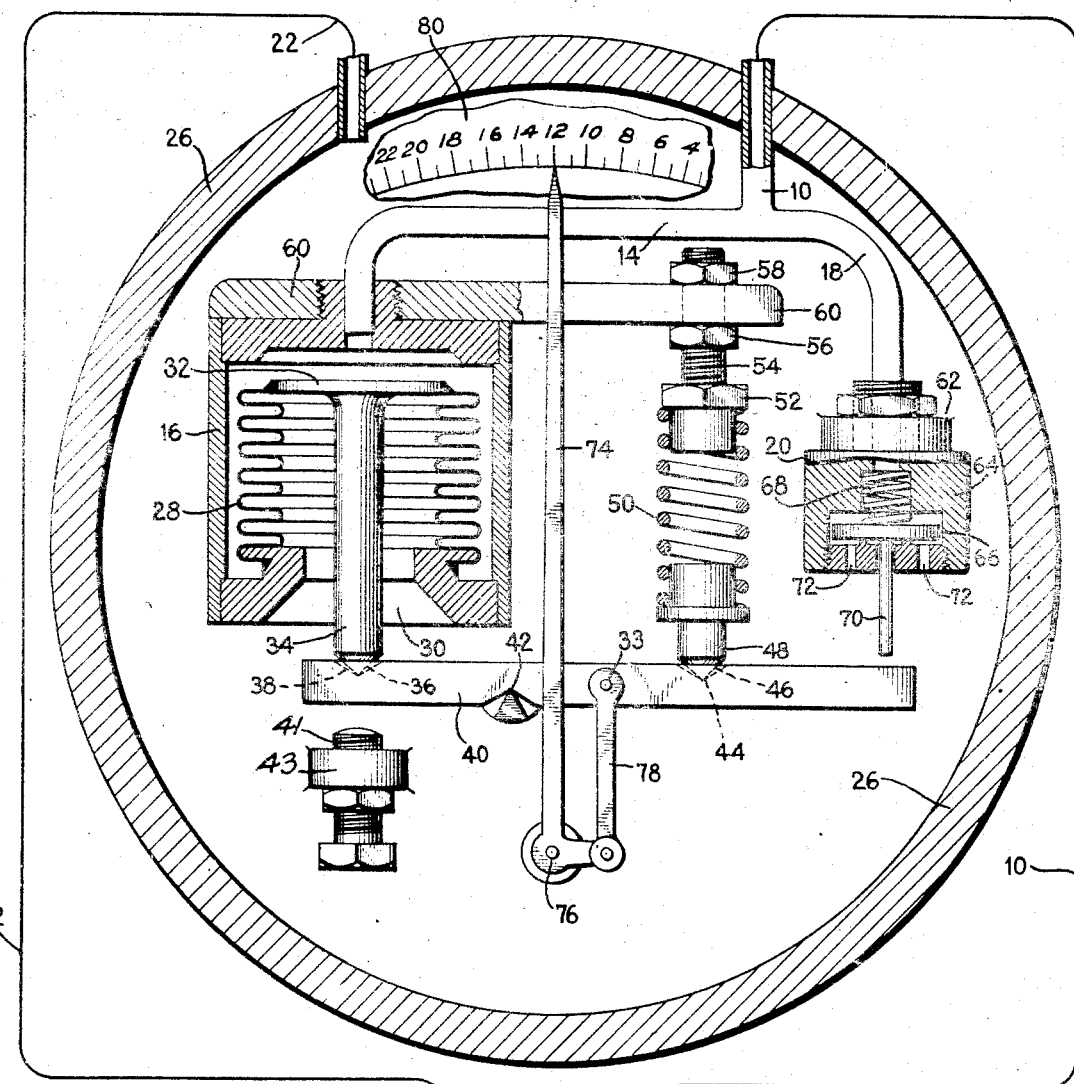
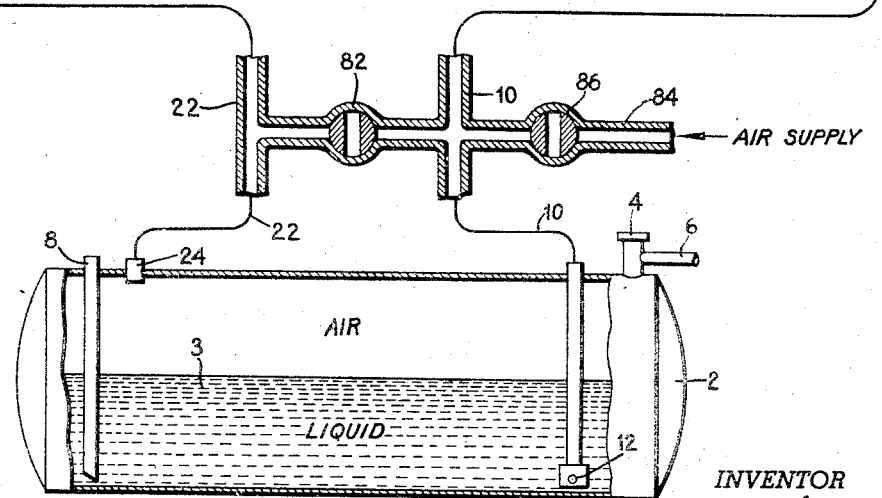
INVENTOR
Clarence A. de Giers
BY
Cooper, Kerr & Dunham
ATTORNEYS Patented Mar. 28, 1944

2,345,464

UNITED STATES PATENT OFFICE 2,345,464

SAFETY DEVICE FOR INSTRUMENTS

Clarence A. de Giers, Forest Hills, N. Y., assignor to The Liquidometer Corporation, Long Island City, N. Y., a corporation of Delaware Application January 8, 1941, Serial No. 373,579

5 Claims. (Cl. 73—302)

This invention relates to a safety device for instruments using bellows. The invention is illustrated and described as applied to a hydrostatic gauge for indicating the liquid contents of a tank under air pressure, as, for instance, when air is forced into a tank containing liquid in order to raise the liquid to an elevation, without pumping. Under such conditions the ordinary hydrostatic gauge is useless for indicating the liquid contents because the gauge would respond to the hydro-static head of the liquid plus the air pressure.

In order to obtain correct indications under such conditions, even with an instrument adapted for the purpose, it is necessary at intervals to blow out the tubing connecting the gauge in the tank, particularly just prior to taking a reading. This must be done in order to clear the tubing of moisture of condensation and also to force out any liquid which may have entered the tubing from the tank.

In order to effectively blow the tubing clear, an air pressure is needed considerably in excess of the pressure required for normal gauge operation, and unless precautions are taken, that excess pressure will unduly distort the delicate bellows of the gauge and render it useless for its intended purpose. An object of the invention is to prevent that damage by providing a positively actuated safety device under direct control of the particular bellows needing protection.

Further and other objects and advantages will be apparent from the specification and claims, and from the accompanying drawing which illustrates what is now considered to be a preferred embodiment of the invention.

In the drawing, 2 designates a tank in which liquid 3 may be stored. 4 is an opening for filling the tank with liquid. 6 is an opening through which air may be forced into the tank, and 8 is an outlet from the tank through which the liquid may be forced out of the tank by the air pressure above the liquid in the tank. 10 is a tube having an opening 12 at or near the bottom of the tank, the other, upper end, of the tube being bifurcated, one branch 14 entering chamber 16, and the other branch 18 entering safety valve 20.

The lower end of another tube, 22, is connected at 24 to the top of the tank and the upper end of that tube enters the air-tight indicator case 26. This arrangement of tube 22 allows whatever pressure there may be on top of the liquid in the tank to be transmitted to the inside of the indicator case. This air pressure in the indicator case is, of course, effective on the inside of bellows 28 through its lower open end 30. Bellows 28 is enclosed, as shown, within chamber 16 and the air pressure in chamber 16 is effective on the outside of the bellows.

The upper end of the bellows is closed by a head 32. Extending downwardly from head 32, through opening 30, is a stem 34 which has a conical point 36 resting in a seat 38 in beam 40, the beam being free to rock on knife fulcrum 42. To the right of fulcrum 42 there is in beam 40 another conical seat 44 in which rests the conical lower end 46 of a plug 48 which is connected by upwardly extending compression spring 50 to a plug 52 adjustably secured by threaded bolt 54 and nuts 56, 58, to a bracket 60 rigidly attached to the rear wall of indicator case 26. Bracket 60 also serves to support bellows chamber 16.

Bracket 62, fixed to the indicator case, serves as a support for safety valve housing 64 containing a mushroom valve 66 held normally on its seat by spring 68. Valve 66 has a downwardly extending stem 70, the lower end of which is close to the top of beam 40 in order that if the right hand end of the beam rises a predetermined distance it will come into contact with stem 70, and raise valve 66 from its seat to allow escape of air past the valve through orifices 72.

A pointer 74 pivoted at 76 is actuated by beam 40 through link 78 pivotally connected to the beam at 33 to indicate the tank contents on chart 80.

Tubes 10 and 22 are inter-connected through a valve 82, normally closed so the interior of bellows 28 is subjected only to the pressure of air in tank 2 through tube 22, indicator case 26 and passage 30. The exterior of the bellows, on the other hand, is subjected to the air pressure in the tank plus the pressure due to the head of liquid in the tank, through tube 10, tube 14 and chamber 16. This "plus" pressure acting on head 32 of the bellows, through stem 34, rocks lever 40 about its fulcrum 42 and moves indicator 74 across chart 80 to indicate the liquid contents of the tank. In this normal indicating operation beam 40 does not disturb safety valve 66 because the beam does not touch valve stem 70.

But before taking a reading as above described it is necessary, as explained above, for the sake of accuracy, to blow out the tubing, and that operation will now be described. Valve 82 is opened and then air under pressure is admitted from pipe 84 through valve 86 into pipes 10 and 22. Since pipe 10 is connected directly, through its branch 14, to chamber 16, the "blow-out" pressure from pipe 84 is effective almost instantly on the outside of bellows 28, including its head 32. Unfortunately, there is considerable time lag before that same pressure can be effective on the inside of the bellows, because the air passing through pipe 22 must first fill the entire instrument case 26 and the gas space of the tank 2 except when the tank is full of liquid. Were it not for the protection afforded by the present invention, that time lag would permit destructive collapse of the bellows.

The invention provides means under control of the bellows itself for preventing such injury to the bellows. When the blow-out pressure in chamber 16 collapses the bellows, but before the metal of the bellows is strained to its elastic limit, the left hand end of beam 40 is depressed sufficiently by the bellows to cause the right hand end of the beam to engage valve stem 70, lifting valve 66 from its seat thereby allowing air to escape by way of pipe 18 through orifices 72, thus relieving pressure in pipe 10 and chamber 16. Not only does this operation relieve pressure on the exterior of the bellows, but the air escaping from the safety valve is discharged into case 26, thus helping to raise the pressure within the bellows at the same time the pressure on the exterior of the bellows is being lowered. An adjustable stop 41, mounted in the lug 43 carried by the casing 26, limits the movement of the beam 40 in a counter-clockwise direction.

It is to be understood that the invention is not limited to the specific embodiment herein illustrated and described, but may be used in other ways without departure from its spirit as defined by the following claims.

What is claimed is:

1. In an instrument of the class described, in combination, a metallic bellows, an indicator operated by said bellows, means for normally subjecting said bellows to internal and external fluid pressures to cause said indicator to indicate in accordance with the difference in said pressures, blow-out means operable upon said bellows at intervals and subjecting said bellows to abnormally high pressure differentials, and means controlled by said bellows for preventing injury to said bellows by the operation of said blow-out means, said means, controlled by said bellows, including a valve for opening communication between the opposite sides of said bellows.

2. In an instrument of the class described, in combination, a metallic bellows, an indicator operated by said bellows, means for normally subjecting said bellows to internal super-atmospheric fluid pressure and to external super-atmospheric fluid pressure to cause said indicator to indicate in accordance with the difference in said pressures, blow-out means operable upon said bellows at intervals and subjecting said bellows to abnormally high pressure differentials, and means operated by said bellows for preventing injury to said bellows by the operation of said blow-out means, said means, operated by said bellows, including a valve for opening communication between the opposite sides of said bellows.

3. In an instrument of the class described, a bellows operable by differences in internal and external fluid pressures on said bellows, means for supplying fluid under pressure to one side of said bellows, means for supplying fluid under pressure to the other side of said bellows, means under control of the operator for increasing both said pressures, in combination with means operable by said bellows for preventing injury to said bellows if one of said increased pressures should unduly exceed said other increased pressure, said last mentioned means being effective to transfer fluid from the high pressure side to the lower pressure side of said bellows.

4. Apparatus for indicating the liquid contents of a tank under pressure, comprising in combination, a bellows, means comprising a tube connecting one side of said bellows to said tank above the liquid, means comprising a second tube connecting the other side of said bellows to the bottom of the liquid in the tank, means under control of the operator for forcing high pressure air through said tubes simultaneously, and means under control of said bellows for preventing pressure of said high pressure air on one side of said bellows from unduly exceeding the pressure on the other side thereof, said last mentioned means including means for transferring air from the higher pressure side of said bellows to the lower pressure side thereof.

5. In an instrument of the class described, a bellows operable by differences in internal and external fluid pressures on said bellows, means for supplying fluid under pressure to one side of said bellows, means for supplying fluid under pressure to the other side of said bellows, means under control of the operator for increasing both said pressures, in combination with means controlled by said bellows for preventing injury to said bellows if one of said increased pressures should unduly exceed said other increased pressure, said last mentioned means being effective to transfer fluid from the high pressure side to the lower pressure side of said bellows.

CLARENCE A. DE GIERS.